US009455055B2

(12) United States Patent
Baller et al.

(10) Patent No.: US 9,455,055 B2
(45) Date of Patent: Sep. 27, 2016

(54) ELECTROCHEMICAL PHASE TRANSFER DEVICES AND METHODS

(75) Inventors: Marko Baller, Garching b. Munchen (DE); Victor Samper, Garching b. Munchen (DE); Christian Rensch, Garching b. Munchen (DE); Christoph Boeld, Garching b. Munchen (DE)

(73) Assignee: General Electric Company, Schenectady, NY (US)

( * ) Notice: Subject to any disclaimer, the term of this patent is extended or adjusted under 35 U.S.C. 154(b) by 1255 days.

(21) Appl. No.: 13/377,881

(22) PCT Filed: Jul. 12, 2010

(86) PCT No.: PCT/US2010/041735
§ 371 (c)(1),
(2), (4) Date: Dec. 13, 2011

(87) PCT Pub. No.: WO2011/006166
PCT Pub. Date: Jan. 13, 2011

(65) Prior Publication Data

US 2012/0145557 A1 Jun. 14, 2012

Related U.S. Application Data

(60) Provisional application No. 61/224,614, filed on Jul. 10, 2009.

(51) Int. Cl.
*C02F 1/46* (2006.01)
*G21G 1/00* (2006.01)

(52) U.S. Cl.
CPC ...... *G21G 1/001* (2013.01); *G21G 2001/0015* (2013.01)

(58) Field of Classification Search
CPC .................... G21G 1/001; G21G 2001/0015; B01D 59/40; B01D 59/42
See application file for complete search history.

(56) References Cited

U.S. PATENT DOCUMENTS 5,770,030 A * 6/1998 Hamacher .............. A61K 51/12 205/43
8,491,776 B2 7/2013 Nakanishi et al.
2003/0010619 A1* 1/2003 Hyodo ...................... C01B 5/02 204/157.2
2006/0175953 A1 8/2006 Swain et al.

(Continued)

FOREIGN PATENT DOCUMENTS

JP 10-284050 10/1998
JP 2001-143976 5/2001

(Continued)

OTHER PUBLICATIONS

PCT/US2010/041735 ISRWO dated Oct. 19, 2010.

*Primary Examiner* — Arun S Phasge
(74) *Attorney, Agent, or Firm* — Dean D. Small; The Small Patent Law Group, LLC

(57) ABSTRACT

Devices and methods for electrochemical phase transfer utilize at least one electrode formed from either glassy carbon or a carbon and polymer composite. The device includes a device housing defining an inlet port (42), an outlet port (44) and an elongate fluid passageway (36) extending therebetween. A capture electrode (12) and a counter electrode are positioned within said housing such that the fluid passageway extends between the capture and counter electrodes.

20 Claims, 7 Drawing Sheets

(56) References Cited

U.S. PATENT DOCUMENTS

| | | | |
|---|---|---|---|
| 2009/0029196 | A1 | 1/2009 | Finkelshtain et al. |
| 2010/0069600 | A1 | 3/2010 | Morelle et al. |
| 2010/0101943 | A1 | 4/2010 | Iwata et al. |

FOREIGN PATENT DOCUMENTS

| | | | |
|---|---|---|---|
| JP | 2004-066055 | | 3/2004 |
| JP | 2007-101237 | | 4/2007 |
| JP | 2008198580 | | 8/2008 |
| KR | 2004-066055 | | 4/2004 |
| WO | 2008/028260 | A2 | 3/2008 |
| WO | 2008/011738 | | 10/2008 |
| WO | 2008/117388 | A1 | 10/2008 |

* cited by examiner

ELECTROCHEMICAL PHASE TRANSFER DEVICES AND METHODS

This application is a filing under 35 U.S.C. 371 of international application number PCT/US2010/04173, filed Jul. 12, 2010, which claims priority to U.S. application No. 61/224,614 filed Jul. 10, 2009, the entire disclosure of which is hereby incorporated by reference.

FIELD OF THE INVENTION

The present invention is related to the production of tracers useful for positron emission tomography (PET) and single photon emission computed tomography (SPECT). More specifically, the present invention is directed to methods and devices for transferring radioisotopes utilizing electrochemical methods. Furthermore, methods and devices for the integration of the present invention into microfluidic synthesis systems for radiopharmaceutical production are described.

BACKGROUND OF THE INVENTION

In the process of producing radiotracers for PET, a medical molecular imaging method, radionucleids, such as $^{18}F$ must be extracted from the cyclotron target content and transferred into a solvent for the radiochemical labeling reaction. Besides ion exchangers, an electrochemical method can be applied. In a first step, the $^{18}F$ ions in a solution with a first solvent, e.g. $^{18}O$-enriched water, flows past a pair of graphite or glassy carbon electrodes across which a potential is applied. The $^{18}F$ ions are deposited on the positively-charged capture electrode (the anode). In a second step, the first solvent is exchanged with a suitable solvent, e.g. DMSO, and a reverse potential is applied to release the ions from the capture electrode back into the solution. The second solution is then transferred to a separations system for labeling.

If a release voltage is applied during the second step, fluoride gets trapped on the counter electrode (i.e., the anode after reversing the potential or the cathode during the first step) while the fluoride is released into solution from the first electrode by application of the reverse potential. The fluoride is electrophoretically driven to the counter electrode and readsorbed thereon. In order to prevent counter trapping of $^{18}F$ on the cathode, platinum electrodes have been used, as platinum is known for its low fluoride adsorption.

Known processes and structures for trapping and release of $^{18}F^-$ do trap and release $^{18}F^-$ but do not ensure that the released $^{18}F^-$ is suitable for a labeling reaction. Specifically, the labeling yield may be low or zero in some cases. One reason could be that high voltages applied during the process create other ions which later then compete with the released $^{18}F$ ions to bind to the provided precursor.

To limit counter trapping, the prior art methods employ one carbon capture electrode and a noble metal counter electrode. The prior art counter electrode is typically formed from a metal, e.g. platinum, to prevent re-adsorption of the radionucleids during the release process applying a reverse potential. Platinum has poor absorption/adsorption properties for fluoride ions.

Whether formed from platinum or solid graphite or glassy carbon plate, the electrodes of the prior art provide several challenges. They are very expensive, hard to machine and hard to integrate into a mass manufacturable process such as injection molding. For example, the prior art has used monolithic glassy carbon plates for the electrodes. However, these are very expensive, costing about $250 for a 25×25×3 $mm^3$ piece, and are also difficult to machine and complex to integrate into a disposable product.

WO 2009/015048 A2 describes coin-shaped and long-channel shaped electrochemical cells utilizing metal, graphite, silicon, and polymer composites of these materials. The document describes that the precursor is introduced into the cell and that gas drying is achieved with heating and acetonitrile drying. The operation is described as employing potentials up to 500V.

WO 2008/028260 A2 describes electrochemical phase transfer devices consisting of a fine network of carbon filaments. An electrical double layer is used for capture, making it possible to trap $^{18}F^-$ without applying an external voltage. Cold Acetonitrile is listed as a method for drying. No or low externally applied voltage minimizes REDOX reactions. Heating is described for improving release of the trapped ions.

Both WO 2008/028260 A2 and WO 2009/015048 A2 describe the use of alternating currents during the step of releasing of the fluoride.

There is therefore a need for a disposable electrochemical phase transfer reactor which may be easily produced while still providing sufficient operating efficiencies. The integration of solid glassy carbon plates into a disposable phase transfer unit is complex due to the high cost of the glassy carbon, the need to CNC machine the glassy carbon, the poor ability of the glassy carbon to bond to plastics, and the difficulty of maintaining the glassy carbon microstructures free of leaks. There is also a need for a method of performing electrochemical phase transfer which provides an acceptable yield of a labeling ion which will attach to a precursor.

SUMMARY OF THE INVENTION

In view of the needs of the art, the present invention is a device and a process that performs electrochemical phase transfer. Desirably, the present invention is a device and process for electrochemical phase transfer of $^{18}F^-$ from $[^{18}F]H_2{}^{18}O$ to an aprotic solvent, and for preparation of the radionuclide for a PET tracer nucleophilic substitution labeling reaction.

The present invention allows a synthesis process to be performed on a microfluidic device without requiring azeotropic drying. This is important as drying on a closed microfluidic chip can be challenging to implement since it requires 1) integration of solvent resistant, semi-permeable membranes and 2) re-solution of solid or semi-solid particles and material after azeotropic drying. This means that the invention results in a simplification of the microfluidic device, resulting in lower manufacturing cost to the chip producer due to the need to combine fewer different materials and/or processes. Furthermore, the invention enables all-liquid processing to be performed, reducing the need for radioactive gas handling capabilities in the surrounding instrumentation. This reduces the infrastructure burden on the customer and enables a simpler, and lower cost, instrument.

The present invention describes the construction and operation of key components of a phase transfer method which may be used in conjunction with a microfluidic synthesizer for the production of single-patient dose PET and SPECT tracers.

Moreover, the invention provides devices and processes for electrochemical phase transfer of $^{18}F^-$ from $[^{18}F]H_2{}^{18}O$ to an aprotic solvent, and for preparation of the radionuclide for a PET (positron emission tomography) tracer nucleophilic substitution labeling reaction. The present invention provides the ability to dry the cell, to operate at low voltages, and to manufacture the cell using standard high-volume techniques such as injection molding.

In one embodiment, the present invention described herein employs an injection moldable composite material as an electrode material for the extraction of $^{18}F$ from water and transfer into a solvent. The composite material consists of a blend of a chemically compatible polymeric material such as Cyclic Oleofinic Copolymer (COC) and carbon particles, e.g. glassy carbon particles. The electrodes may be made using known molding techniques, including injection molding. It is contemplated that the electrode surface area may be selected for its carbon/polymer ratio as a means for 'fine tuning' the performance of the electrode, although the electrode desirably has a carbon content of at least 30%. Alternatively, the electrodes of the present invention my be formed by glassy carbon (GC).

The electrodes of the present invention may then be incorporated into a microfluidic structure by known means, including by, but not limited to, multishot injection molding. As platinum electrodes are not required, and the same material may be used for both electrodes, manufacturability is eased and costs reduced. Particularly, when both electrodes are made using the same material, microintegration of the components and method are simplified. Obviating the need for noble metal electrodes by carbon or other suitable low-cost materials is possible through the present invention.

The electrodes of the present invention are separated by a small gap through which a fluid may flow. The electrodes may thus desirably be spaced between 5 μm and 1000 μm apart. Additional sidewalls along the fluidpath may be formed by a gasket or separation layer which thus encloses the fluidpath between opposed inlet and outlet ports. The electrodes thus form a portion of the fluidpath. The fluidpath desirably has a ratio of radiolabeling reaction volume to trapping/desorption [active] electrode surface area to equal to or larger than 30 $\mu l/mm^2$.

Additionally, the methods of the present invention can avoid counter-trapping of the activity during release of the fluoride from the capture electrode, or at least reduce countertrapping to acceptable levels. In one embodiment, the release solvent and phase transfer catalyst can be selected so as to minimize the occurrence of counter-trapping by neutralizing the charge of the activity, thus allowing greater freedom in the selection of the electrode material. The present invention thus provides the ability to dry the phase transfer device between steps, to operate at low voltages while maintaining high electrical field strengths (>5V/mm) between the electrodes, and to manufacture the device using standard high-volume techniques such as injection molding. The capture and counter electrodes may be formed either in-plane within a device, or in a stacked configuration. The counter electrodes used may be non-metallic while both electrodes may be made of the same material, including glassy carbon or blends of glassy carbon and polymer. The devices and methods of the present invention thus allow successful electrochemical trapping, release and subsequent radio labeling on a chip Prior work in this field has not overcome the technical issues that prevent the device from performing phase transfer in an efficient and reproducible manner.

DETAILED DESCRIPTION OF THE PREFERRED EMBODIMENT

The present invention thus provides both devices and processes for electrochemical phase transfer of $^{18}F^-$ from $[^{18}F]H_2{}^{18}O$ to an aprotic solvent, and for preparation of the radionuclide for a PET tracer nucleophilic substitution labeling reaction.

A first aspect of the present invention employs a carbon material capture electrode, e.g. glassy carbon (GC), graphite, carbon composites or a thin film deposited carbon species. In particular, GC sold under the brandname SIGRADUR® by HTW HochtemperaturWerkstoffe GmbH, Gemeindewald 41, 86672 Thierhaupten Germany (see http://www.htw-gmbh.de/technology.php5?lang=en&nav0=2) has been found suitable for the present invention. The use of graphite powder instead of GC is also contemplated by the present invention, although experiments have shown less $^{18}F$ desorption yield when using graphite powder as compared to GC.

The electrode of the present invention may be formed from an injection moldable composite material so as to enable the extraction of $^{18}F$ from water and transfer into a solvent. The composite material consists of a blend of a chemically compatible polymeric material such as Cyclic Oleofinic Copolymer (COC) and carbon particles, e.g. glassy carbon particles. Examples of composite materials include GC-COC (Cyclic Olefin Copolymer), GC-PP (Polypropylene), and GC-PE (Polyethylene). A filler such as carbon fibres or carbon nanotubes can be added to reduce the volume fraction of GC while maintaining electrical conductivity, thus making the composite injection moldable. The electrodes may then be made using known molding techniques, including injection molding. It is contemplated that the electrode surface area may selected for its carbon/polymer ratio as a means for 'fine tuning' the performance of the electrode, although the electrode desirably has a carbon content of at least 30%. As the carbon/polymer blend electrodes are easy to manufacture using state of the art multishot injection molding techniques, it is therefore possible to monolithically integrate the phase transfer into a polymeric microfluidic synthesizer chip.

Figure 1:
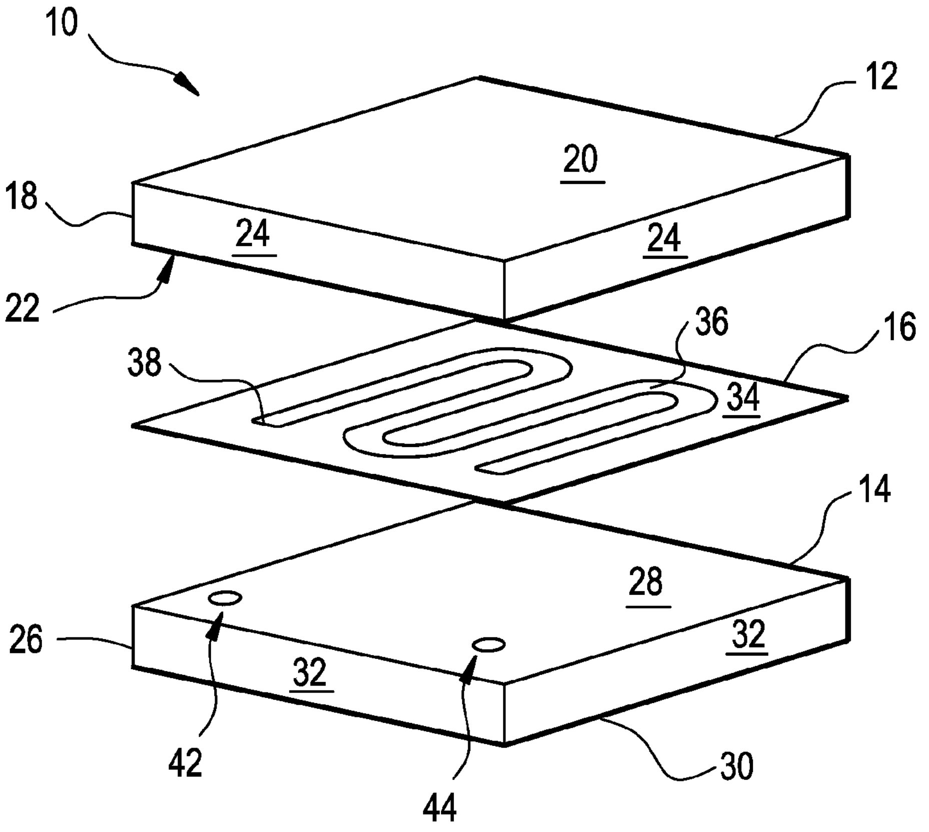
FIG. 1 depicts an electrode of the present invention.
Figure 2:
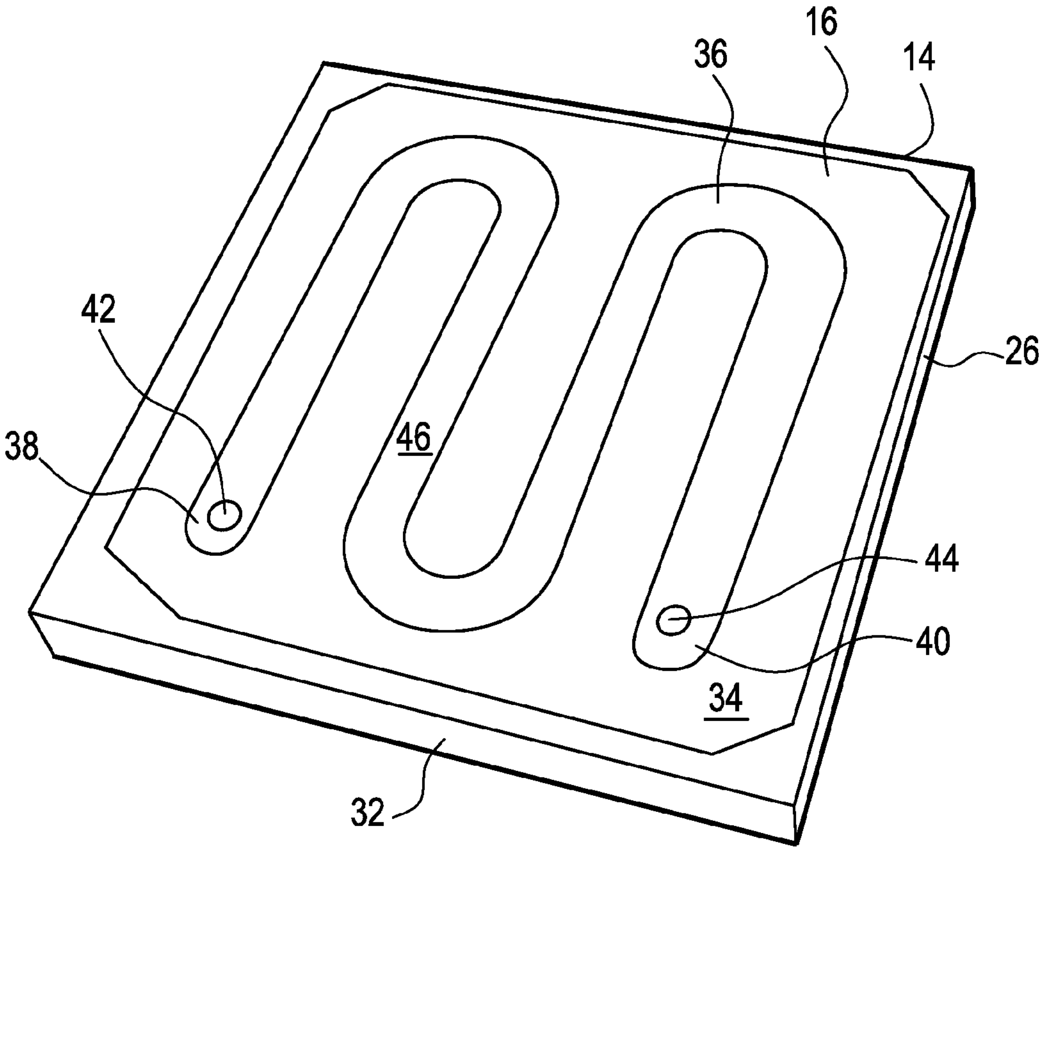
FIG. 2 depicts a gasket, or spacer layer, positioned on an electrode of FIG. 1.

With reference to FIGS. 1 and 2, the present invention further provides a electrochemical phase transfer device 10 employing a capture electrode 12 of the present invention. The device includes a pair of electrodes, 12 and 14, separated by a gasket 16. Electrode 12 and 14 are desirably separated between about 5 μm-1000 μm by gasket 16. To better assist drying, the capture electrode is desirably formed of a non-porous carbon structure or a low-porous structure such as glassy carbon (GC) or a GC-COC composite. Gasket 16 is formed from a suitable material, such as polytetraflouroethylene (PTFE). Gasket 16 may alternatively be formed from COC, or other suitable material, and bonded to electrodes 12 and 14 by known techniques so as to provide separation between the electrodes while defining the flow channel in a manner that may be easily manufactured by bonding the COC gasket to the electrodes.

Electrode 12 includes a planar body 18 providing opposed major surfaces 20 and 22 and is bounded by perimetrical edge 24. Electrode 14 includes a planar body 36 providing opposed major surfaces 28 and 30 and is bounded by perimetrical edge 32. Gasket 16 includes a planar sheet body 34 and defines an elongate channel aperture 36. Channel aperture 36 desirably has a serpentine shape extending from a first end 38 to opposed second end 40. Second electrode body 18 defines an inlet port 42 and an outlet port 44, each port extending in open fluid communication between major surfaces 28 and 30. Gasket 16 is sandwiched between electrodes 12 and 14 so that first end 38 of channel aperture 36 is positioned in registry with inlet port 42 and second end 40 of channel aperture 36 is positioned in registry with outlet port 44. When assembled, device 10 forms a fluid flow channel 46 extending along channel aperture 36 in fluid communication between inlet port 42 and outlet port 44 and bounded between major surfaces 22 and 28.

Figure 3:
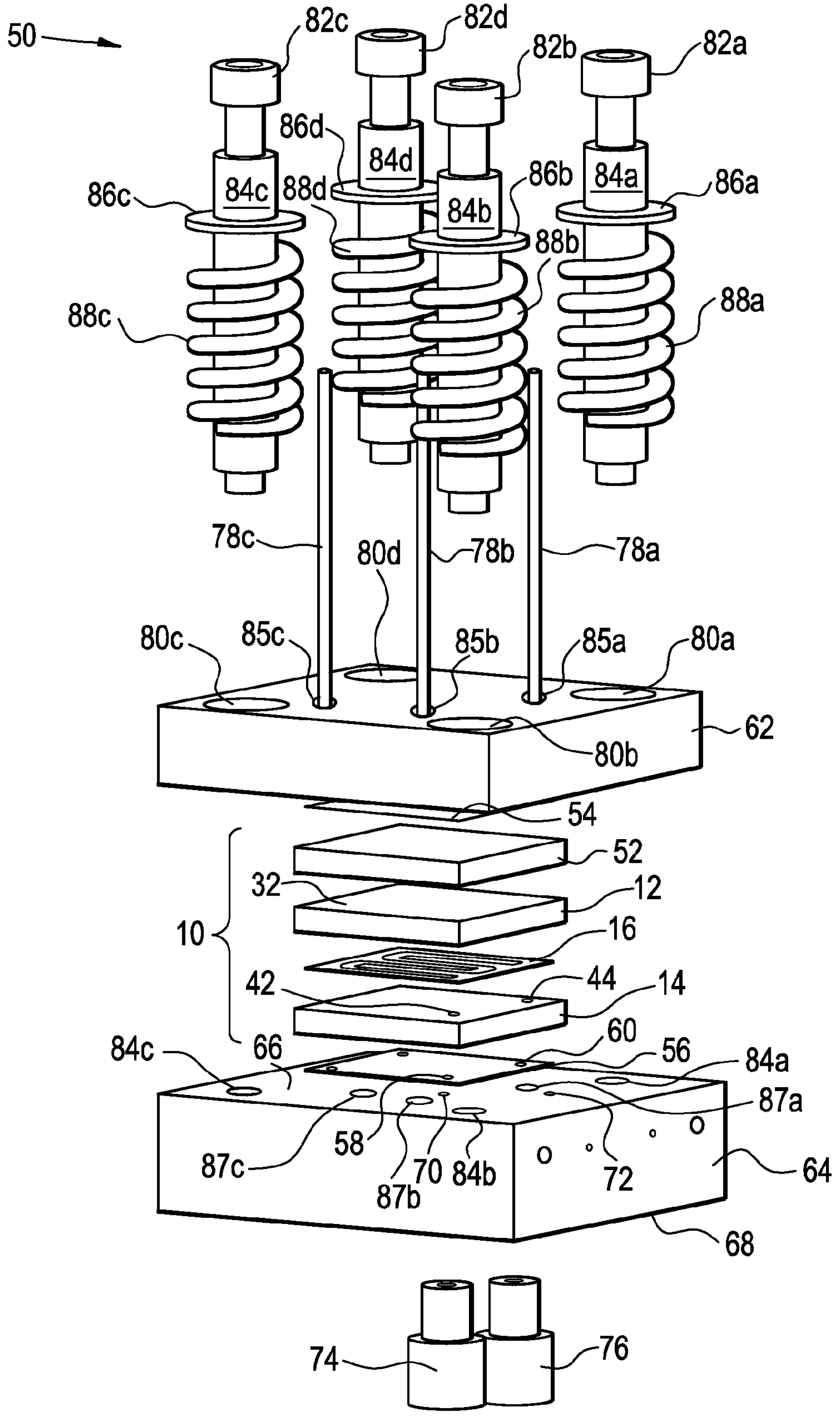
FIG. 3 depicts an exploded view of an electrochemical phase transfer flow cell of the present invention.
Figure 4:
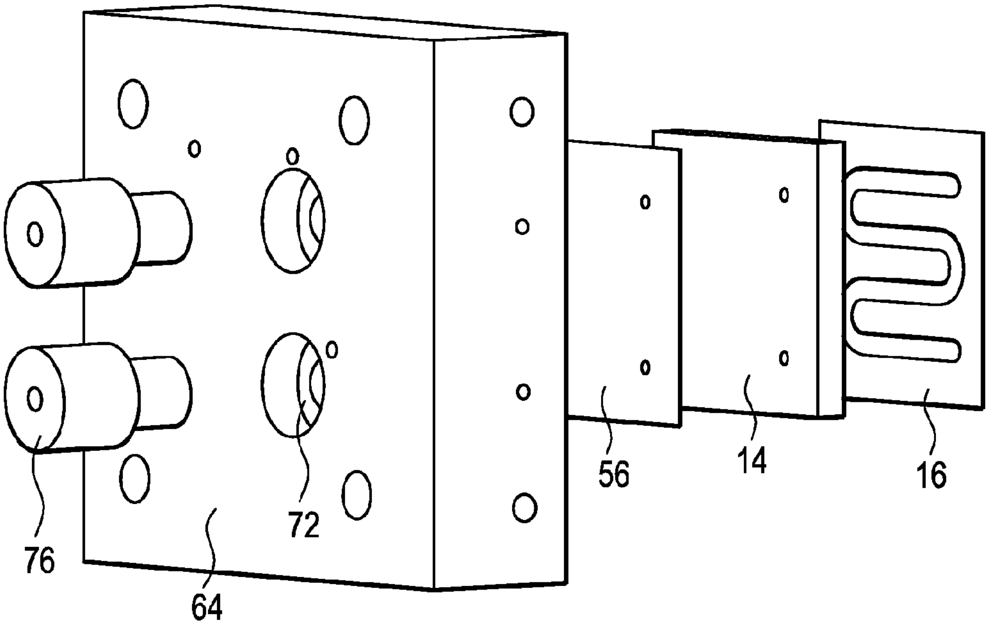
FIG. 4 depicts an exploded view of one portion of the flow cell of FIG. 3.

Referring now to FIGS. 3 and 4, electrochemical phase transfer device 10 may be incorporated into an electrochemical cell 50. Electrochemical cell 50 positions a copper plate 52 upon major surface 30 of electrode 14, and the copper plate/device assembly between a first and second opposed insulation layers 54 and 46, respectively. Second insulation layer 56 provides an inlet and outlet aperture 58 and 60, respectively, which are positioned in registry with inlet and outlet ports 42 and 44, respectively, of device 10. This entire sub-assembly is compressed between first and second plate 62 and 64. Second plate includes opposed first and second major faces 66 and 68 and defines inlet port 70 and outlet port 72 extending in open fluid communication between major faces 66 and 68. Inlet port 70 and outlet port 72 are positioned in fluid registry with inlet and outlet apertures 58 and 60, respectively, of second insulation layer 56. Second major face 68 accommodates first fitting 74 and second fitting 76 with inlet port 70 and outlet port 72, respectively. Fittings 74 and 76 enable easier connection to fluid conduits and other hardware used to drive fluid through electrochemical cell 50. Both plates 62 and 64 include elongate passages therein to accommodate positive positioning rods 78*a-c* about device 10. Plate 62 defines through apertures 80*a-d* therethrough to accommodate screws 82*a-d* therethrough. Major face 66 of plate 64 defines inwardly-threaded recesses 84*a-d* for threadingly mating to screws 82*a-d*. Each screw 82*a-d* is affixed to an elongate washer 84*a-d*, the outer surface of which supports a fixed washer 86*a-d*. A spring 88*a-d* is positioned with each screw so as to provide compressive force between its respective washer and plate 64 when the screw is tightened into its associated recess 84*a-d*.

The present invention contemplates that electrode 14 of electrochemical phase transfer device 10 may also be formed from a carbon-based material. In one embodiment, counter electrode 14 may also be formed of a similar composition to the capture electrode 12, thus facilitating miniaturization and production. Miniaturization will overcome the current infrastructure burden associated with the synthesis of PET and SPECT tracers. It will allow that more hospitals can manufacture PET and SPECT tracers and thereby also purchase PET and SPECT scanners while at the same time offer a larger variety of tracers.

The device described can be produced by low-cost manufacturing techniques to include two electrodes. The working electrode, capture electrode 12, can be of GC, a GC composite, or a non-porous nano-structured carbon material or its composite. The counter-electrode, electrode 14, can thus be of the same material, or alternatively the counter-electrode can be of a different material from the capture electrode, selected either from the same family of materials used for the capture electrode, or from a completely different family of materials. An example of a completely different family of materials is metals such as platinum. The electrodes are arranged in an opposing configuration where they can be parallel but need not be parallel.

The present invention may be integrated into or combined with other microfluidic systems such as “Lab-on-Chip” systems, micro- or mesofluidic synthesis or analysis devices, micro Total Analytic System (μTAS) and conventional (large scale) synthesizer devices for production of radiopharmaceuticals. The present invention may be used as or combined with reactors, storage vessels, purification systems such as HPLC, MPLC, UHPLC, SEP-Pak® (sold by Waters GmbH, Helfmann-Park 10, 65760 Eschborn, Germany), subsequent drying units (evaporators), valves, mixers, channel structures, tubing, capillaries and capillary-based fluidic systems.

Figure 5:
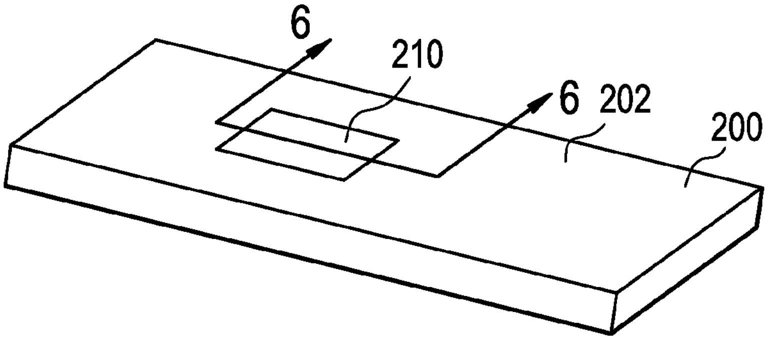
FIG. 5 depicts a microchip incorporating an electrode of the present invention.
Figure 6:
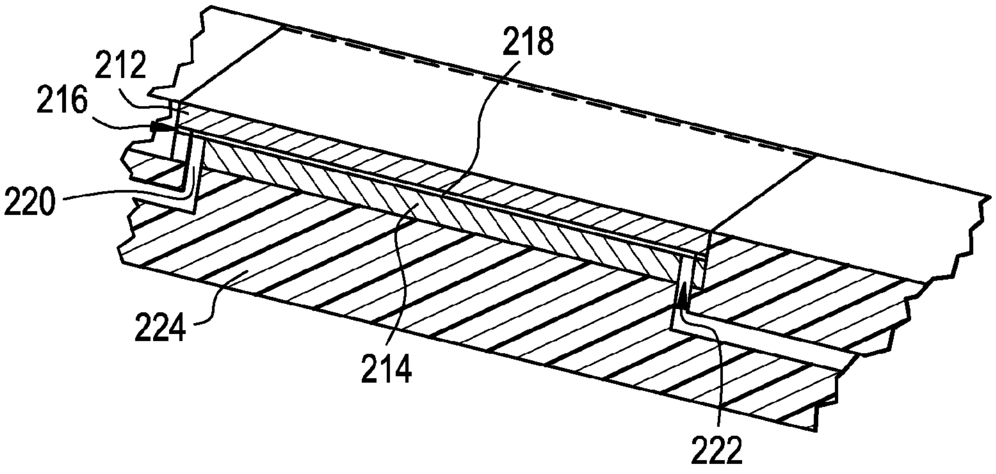
FIG. 6 depicts an alternate microchip of the present invention.

FIGS. 5 and 6 depict a microfluidic chip 200 having a chip body 202 incorporating an electrochemical phase transfer device 210 of the present invention therein. Device 210 is similar in structure to device 10, desirably using an insert or multiple inserts formed of GC and/or a GC-COC composite for the electrodes 212 and 214. A gasket 216 (or any other separation device as taught by the present invention) is compressed between electrodes 212 and 214 such that a fluid passageway 218 is defined between electrodes 212 and 214. Electrode 214 defines a fluid inlet port 220 and a fluid outlet port 222 such that fluid passageway extends in fluid communication therebetween. Inlet port 220 and outlet port 222 are desirably placed in fluid communication with other features of chip 200, as defined by chip body 202, as may be useful in the synthesis process (such as reservoirs, reactors, feeding channels, etc.). Device 210 can be assembled and compressed into a leak-tight arrangement at the point of use, or can be permanently bonded during fabrication. The separation between the electrodes can be defined by the assembly/bonding process, or can be defined by a gasket arrangement as in device 10, or by a structure using stand-off features. Microchip 200 provides reactors for labeling and hydrolysis reactions, as well as chambers for reagent storage and valves (not shown).

The electrodes as shown in and described for FIGS. 1, 5 and 6 are stacked out-of-plane (a sandwich structure) and substantially parallel. Alternatively, an in-plane (an extruded and/or machined-type structure relative to the plane of the device) arrangement is possible, as shown in and described for microchip 100 of FIG. 7. Microchip 100 incorporates an electrochemical phase transfer device 110 comprising first electrode 112 and second electrode 114. An elongate flowpath 118 is defined between opposed parallel undulating edges 113 and 115 of co-planar anode 112 and cathode 114, respectively. Alternatively still, as shown in and described for FIGS. 9 and 10, the cathode may be oriented with respect to one or more anodes so as to be in tapering, non-parallel alignment for defining the flowpath therebetween.

Figure 7:
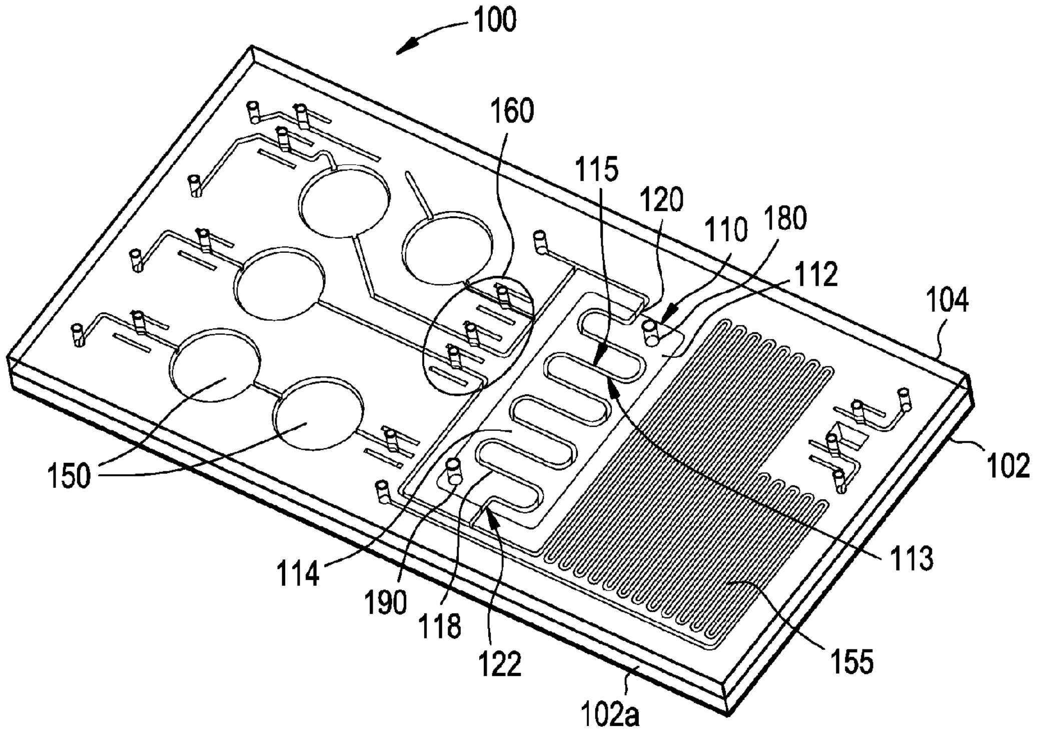
FIG. 7 depicts a partial cross-sectional view of the microchip of FIG. 6.

With additional reference to FIG. 7, microchip 200 includes a lower planar body 102 and an upper planar body 104 between which electrodes 112 and 114 are positioned so that flowpath 118 extends in fluid-tight communication between inlet port 120 and outlet port 122. The present invention contemplates that electrodes 112 and 114 may be formed from an original electrode body which has been milled, cut, or otherwise machined along the path of flowpath 118 such that the resulting two portions of the original electrode body now form electrodes 112 and 114. Flowpath 118 is thus in the same plane as inlet port 120 and outlet port 122. As will be appreciated by those of skill in the art, microchip 100 may include additional molded portions. In the embodiment of FIG. 7, it is contemplated that electrodes 112 and 114 are formed flush with the mating surface 102*a* of body 102. Body 104 thus acts as a cover for the all of the fluid flowpaths and storage areas of chip 100. Chip 100 also includes reservoirs 150, reactors 155, and valves 160, defined between bodies 102 and 104, some of which may be in fluid communication with flowpath 118 of device 110. Planar body 104 defines various access ports which extend in fluid communication with various of the flow channels and fluidpaths of chip 100. For example, port 170 extends through body 104 so as to be in fluid communication with feeding channel 182 and inlet port 120. Body 104 also defines access ports 180 and 190 opening in registry with electrodes 112 and 114, respectively. Access ports 180 and 190 allow electrical connection to electrodes 112 and 114 through body 104.

Figure 8:
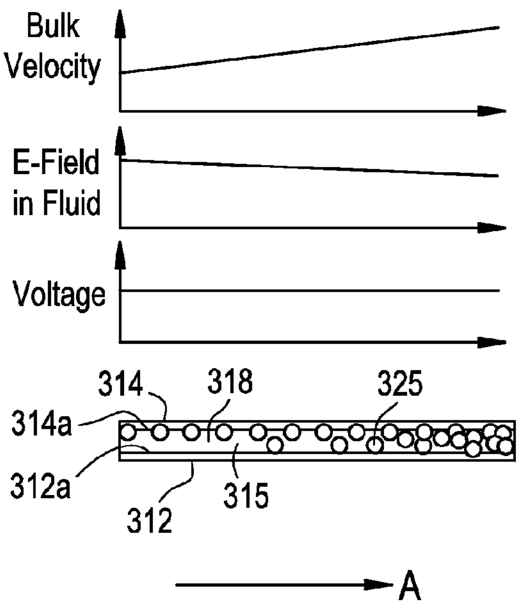
FIG. 8 depicts a flow between parallel electrodes of the present invention, with representative performance graphs thereabove.
Figure 9:
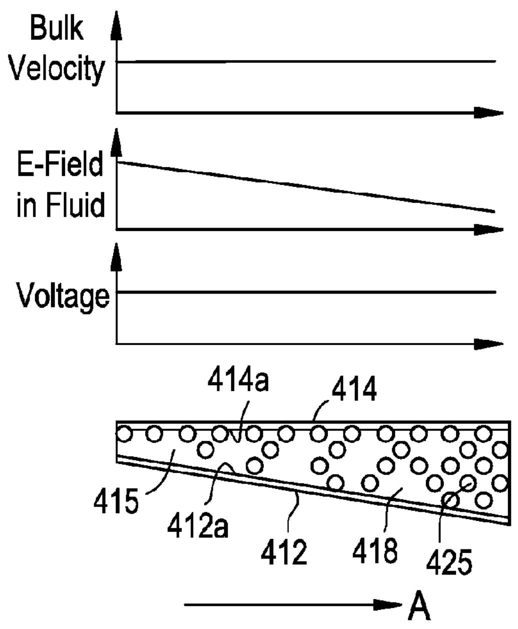
FIG. 9 depicts flow between a pair of electrodes of the present invention in non-parallel alignment, with representative performance graphs thereabove.
Figure 10:
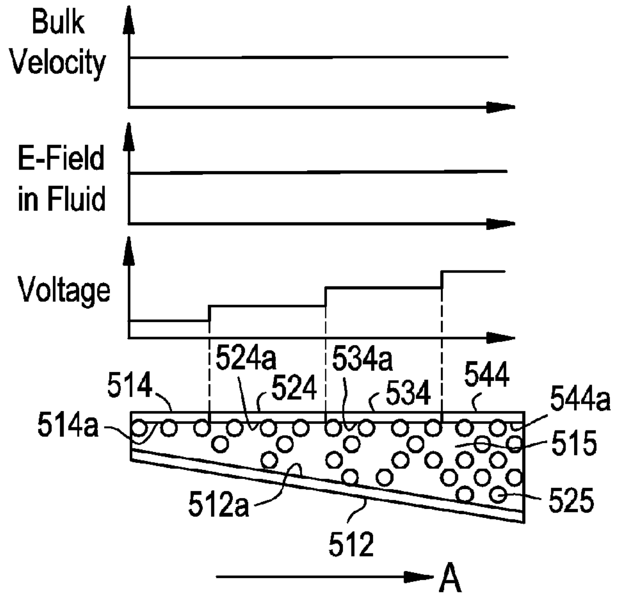
FIG. 10 depicts an alternate arrangement of electrodes of the present invention, with representative performance graphs thereabove.

FIGS. 8-10 depicts flow between electrodes of the present invention, with representative performance graphs thereabove. In FIG. 8, the cathode 312 and anode 314 include elongate planar surfaces, 312*a* and 314*a*, respectively, which extend in parallel to one another and define an elongate flowpath 318 therebetween. Fluid 315 flows in the direction of Arrow A. As seen in FIG. 8, when a constant voltage is applied between cathode and anode, gas bubbles 325 will form in the fluid due to electrolysis which can then collect in the downstream portion of the flowpath. The gas bubbles 325 deleteriously affect the electric field in the fluid, so that the further along the fluidpath, the greater the collection of bubbles and the weaker the field strength. Additionally, the gas bubbles form obstacles which the fluid must flow past, resulting in an increase in bulk fluid velocity the farther down the flowpath the fluid 315 travels. The gas bubbles 325 may be compensated for by the geometric structure of device or increased system pressure that compresses bubbles and reduces impact on the electrochemical process. Gas bubbles may also be compensated by electric discharge elements, catalysts or gas permeable structures/membranes.

FIG. 9 depicts flow between a pair of electrodes of the present invention in non-parallel alignment, with representative performance graphs thereabove. In FIG. 9, cathode 412 and anode 414 are placed in tapering, non-parallel alignment. Cathode 412 and anode 414 include opposed planar faces 412*a* and 414*a*, respectively, which define a tapering flowpath 418 therebetween. Fluid 415 flows in the direction of Arrow A. As flowpath 418 tapers outwardly with respect to the flow direction, gas bubbles 425 formed by electrolysis have more room to flow and will not as readlily bunch together as was the case in FIG. 8. However, the field strength will decrease as distance between cathode and anode grows. But as the gas bubbles are not as constricted within flowpath, the bulk velocity can remain near constant.

FIG. 10 depicts yet another arrangement of electrodes of the present invention, with representative performance graphs thereabove. In FIG. 10, cathode 512 is opposed by multiple anodes 514, 524, 534, and 544. Anodes 514, 524, 534, and 544 are positioned adjacent one another so as to provide faces 514*a*, 524*a*, 534*a*, and 544*a* in substantially co-planar alignment. Cathode 512 provides face in opposition to faces so as to form flowpath therebetween. Similar to FIG. 9, flowpath 518 is thus formed between electrodes 512, 514, 524, 534, and 544 in tapering, non-parallel alignment, such that flowpath 518 gets wider in the direction of fluid travel. Fluid 515 travels in the direction of Arrow A. As shown in the accompanying performance graphs, anodes can each apply a stepped-up voltage along flowpath. The increased voltage in succeeding anodes helps maintain the electric field within the fluid while the bulk velocity is also maintained as described for FIG. 9. Gas bubbles 525 provide sufficient separation that the bulk velocity of fluid 515 therepast is maintained.

It is desirable that the shape of the electrodes and the microfluidic channel facilitates drying (e.g., no dead-corners or gas-trapping pores), and facilitates the transport and removal of gas generated in the device by electrolysis. Gas bubbles can be pinned on single surfaces or between multiple surfaces. Gas bubbles shield the active trapping surface on the anode from target ions, and increase the local fluid velocity by reducing the effective cross-section area of the flow channel for fluids. Gas bubbles can be compressed and reduced in volume by increasing the pressure of the system. The pressure can be increased by various methods including flow-restrictions on the output of the flow-channel.

A further feature of the device is the possibility to shape the electric fields by geometric variations in the electrode design or the electrode separation, to control the inter-play between the drift velocity of ions in the bulk, outside of the electrical double layer, and the bulk velocity of the fluid. This is shown in FIGS. 8-10, where different configurations are illustrated side by side.

In general, it has been found that the fluid flow passages, or flowpaths, of the continuous flow structures of the present invention should be long, rather than wide. The electrodes may be parallel or non-parallel, and employ a uniform electric field or employ a field gradient along the flowpath. The electrodes of the present invention desirably provide a surface area exposed to the flowpaths of 0.5 $mm^2$-1000 $mm^2$, depending on the fluid volumes. The electrodes of the present invention are separated by a small gap through which a fluid may flow. The electrodes may thus desirably be spaced between 5 μm and 1000 μm apart. Additional sidewalls along the fluidpath may be formed by a gasket or separation layer which thus encloses the fluidpath between opposed inlet and outlet ports. The electrodes thus form a portion of the fluidpath. The fluidpath desirably has a ratio of radiolabeling reaction volume to trapping/desorption [active] electrode surface area to equal to or larger than 30 $\mu l/mm^2$.

Desirably, the present invention employs low voltages at the electrodes while maintaining high fields (eg, by using small separations between the electrodes along the flowpath).

Additionally, the electrodes of the present invention may be realized by mechanically pressed on or in a flow device. GC may be sputtered into an electrode body of the present invention. The electrodes of the present invention may be formed from composite materials be screen printed into shape, formed by injection molding (including in two- or multi-shot molding). The components may be ultrasonically welded or bonded, thermally bonded, or bonded using solvents. The gap or separation between the electrodes may be formed by placing a gasket or spacer between the electrodes or employing thick film techniques. Additionally, a single electrode body may be machined, etched, imprinted, or milled to separate the body into two electrode bodies which may be separated across the gap and serve as a cathode and anode of the present invention. Sacrificial materials may be positioned between the electrodes and then removed (eg, by burning).

Alternatively, as described hereinabove, gasket 16 may be provided in the form of an insert that can be assembled into the substrate during manufacture and sealed by joining techniques or by pressure on a sealing feature. Joining techniques include polymer-polymer bonds such as welding, high temperature bonding, solvent bonds and over molding, or GC to polymer bonds such as $O_2$ plasma surface activation or surface sputtering for cleaning, followed by pressure and heat. Pressure sealing alone refers to configurations where a high pressure is applied to a sealing surface, such that a fluid tight seal is created without bonding. The pressure can be applied externally at the point of use, or can be generated on the device by stressing materials during fabrication.

In the general stacked or out-of-plane configuration, the sandwich of materials can be assembled using gasket layers such as PTFE gaskets, and sealed at the point of use using external pressure. Alternatively the stack can be bonded together, where gasket 16 is replaced by thin or thick film coatings of suitable materials such as COC.

In operation, as target ions flow through flow channel or fluid path of the present invention during the adsorption process, they are pulled to the exposed major surface of the anode. In this way the length of the anode, or the fluid channel, is related to the trapping efficiency, where a longer anode is useful to trap more ions and thus increase the trapping efficiency, for a given electric field strength. However, side-effects during adsorption and desorption lead to reduced yields for the subsequent radiolabeling process. To improve the labelling process it can be advantageous to reduce the total anode surface area. In order to satisfy the requirement of a reduced electrode surface area while maintaining a sufficient adsorption efficiency, the width of the channel can be reduced while keeping the length as desired. Working with 10V trapping potential and 127 μm electrode separation, trapping lengths in the range of 10 mm-100 mm give good results, with 15 mm resulting in 75% trapping and 55 mm resulting in 85-90% trapping efficiency. Starting water volumes of 500 μl-1000 μl have been utilised with an anode surface area of 7 $mm^2$ to 140 $mm^2$, and a width to length ratio of between 1:30 and 1:5. Under certain conditions it is preferred to have the maximum length to width ratio, in order to increase the length with the minimum overall surface area.

The device materials and structure are selected such that the drying process (elimination of water) and the cleaning process (elimination of unwanted species for labeling) is reproducible and can achieve water concentrations less than a target value e.g. 1500 ppm for NITTP/FMISO. Furthermore the protocol for using the device must maintain critical parameters such as the phase transfer catalyst (PTC) concentration. The addition of the PTC during the desorption process is also shown to influence the radiolabelling process. An increase in the PTC concentration by a factor of 4 over the conventional value (e.g. 16 mg/ml K222 at 3.5% K2CO3 (aq) is superior to 4 mg/ml K222 at 3.5% K2CO3) is shown to give improvements to the subsequent labelling process.

It has been confirmed through experimentation that counter trapping can be minimized so as not to play a significant role, e.g., less than 4% reabsorption/readsorption was observed. The reason for this phenomenon lies in the formation of neutral pairs within the solvent solution during the release process. Because of the aprotic character of the solvent into which the ions are released, the $^{18}F$ fluoride anions bind themself to a cation, often provided in the solution. Upon formation of this ion pair, there is no net-charge that would cause the fluoride ions to migrate in an electric field to the counter electrode. Only diffusion could provide that transport. Additionally, the potentials applied by the present invention during the release of the radionucleids are not high enough to provide an efficient reabsorption/re-adsorption on the counter electrode. Therefore, the low potentials applied and the solvent employed can result in a low reabsorption/re-adsorption of the fluoride.

Our experiments have shown that the application of a complexation agent, e.g. Kryptofix K222, used as a phase transfer catalyst in the labeling step, prevents the adsorption on the cathode by forming an ion pair, that is electrically neutral towards the outside. Electrophoretic transport towards the counter electrode and consequent readsorption is suppressed.

However, in some embodiments the suppression of counter-trapping by additives such as K222 maybe supported by a release potential that is alternated during the release process. That is, the potentials on the two electrodes are reversed multiple times during the release process so as to thwart counter-trapping. This method leads to a release of the counter-trapped ions in each voltage cycle, thus increasing the overall release efficiency.

Therefore one can use a carbon electrode as the counter electrode. This electrode can be made from the same material as the trapping electrode therefore simplifying manufacturing and omitting the use of noble metals. In order to further save cost, a cheap graphite based material can be employed for one or both electrodes.

The application of the complexation agent allows to use of any electrode material for the counter electrode, that can withstand the chemical environment it is used in. Others may claim other materials than carbon based materials, such as conductive polymers or other metals.

Phase transfer is performed by applying a trapping voltage between 0.8V and 50V while pumping $[^{18}F]H_2{}^{18}O$ through the device at flow rates between 0 μl/min and 1000 μl/min. Operating at the lower end of the voltage range minimizes undesirable REDOX reactions. The trapping voltage can be pulsed or alternated in polarity to reduce nucleation of gas generated by electrolysis and to increase efficiency.

After trapping, the device is dried and cleaned by any or all of the following techniques: heating at temperatures up to 170° C. under dry $N_2$ or Argon flow, heat to 90° C. while pumping dry Acetonitrile through the device, pump Kryptofix 222+DMSO through the cell at temperatures between room temperature and 90° C. The cell is dried until the residual water in the eluent is below a target value, e.g. 1500 ppm for FMISO labeling using NITTP as the precursor.

Side-effects that are disadvantegeous for radiolabeling are also connected to the heating profile utilized during the release process. Hence, the electrochemical phase transfer needs to be heated gradually between 60° C. and up to 120° C. (depending on the solvent that the ions are released into and the sensitivity of the pre-cursor labeling process to species resulting from electrochemical phase transfer side-effects) during the desorption process, leading to a controlled release of 18-fluoride over time. A temperature profile can apply temperature gradients in the range of 1° C./min up to 60° C./min are useful, and good results have been demonstrated with gradients around 3° C./min-8° C./min. The trapped $^{18}F^-$ may thus released from the electrode surface by heating the cell to temperatures between room temperature and 120° C., while applying an electrical potential in the range of 0.1-10V, of the opposite polarity as during trapping. To minimize counter trapping on the counter-electrode during release and/or increase the release efficiency, the release potential can be continuous, pulsed, or sequentially reversed. The release liquid is an aprotic solvent and a phase transfer catalyst, such as Kryptofix 222 with a potassium counter-ion. The $K^+$/k222 concentration desirably exceeds the sum of $^{18}F^-$ and all other anions' concentration to minimize $^{18}F$ absorption on counter electrode. It is also possible to release directly into the precursor. The feasibility of the methods has experimentally been proven. Trapping of fluoride on the counter electrode accounted for only about 4% of the total activity.

During the release process the phase transfer solvent can flow continuously through the structure or the flow can be stopped.

While the particular embodiment of the present invention has been shown and described, it will be obvious to those skilled in the art that changes and modifications may be made without departing from the teachings of the invention. The matter set forth in the foregoing description and accompanying drawings is offered by way of illustration only and not as a limitation. For example, the fluid paths formed by the electrodes of the present invention go by different names: passageways, flowpaths, fluid paths, etc., but each connote the same meaning of a fluid tight flow channel (achieved with or without other structures) that extend between opposed inlet and outlet ports. The actual scope of the invention is intended to be defined in the following claims when viewed in their proper perspective based on the prior art.

What is claimed is:

1. A method for performing electrochemical phase transfer, the method comprising:

flowing a solution of 18F− ions in H2O between first and second elongate electrodes, wherein at least one of the first or second elongate electrodes is formed from a blend of polymeric material and carbon particles;

applying a potential between the first and second elongate electrodes to trap 18F− ions on the positively-charged one of the first and second elongate electrodes;

reversing the potential between the first and second elongate electrodes;

flowing a solvent between the first and second elongate electrodes while reversing the potential between the first and second elongate electrodes; and gradually heating the electrode on which the 18F− ions were trapped while applying the potential between the first and second elongate electrodes.

2. The method of claim 1, wherein the carbon particles in the first and second elongate electrodes are formed from glassy carbon.

3. The method of claim 1, further comprising removing the H2O from between the first and second elongate electrodes after flowing the solvent between the first and second elongate electrodes.

4. The method of claim 1, wherein the potential is 10 volts or less.

5. The method of claim 1, wherein flowing the solution between the first and second elongate electrodes includes flowing the solution in a flow path defined by a planar gasket disposed between the first and second elongate electrodes.

6. The method of claim 1, wherein flowing the solution between the first and second elongate electrodes includes flowing the solution in a serpentine shaped flow path between the first and second elongate electrodes.

7. The method of claim 1, wherein flowing the solution between the first and second elongate electrodes includes flowing the solution in a flow path sandwiched between the first and second elongate electrodes oriented parallel to each other.

8. The method of claim 1, wherein flowing the solution between the first and second elongate electrodes includes flowing the solution in a flow path between the first and second elongate electrodes that are oriented co-planar with respect to each other.

9. The method of claim 1, wherein flowing the solution between the first and second elongate electrodes includes flowing the solution in a flow path that outwardly tapers with respect to a flow direction of the solution in the flow path.

10. The method of claim 1, wherein the potential is 5 volts or less.

11. The method of claim 10, wherein flowing the solution between the first and second polymer-carbon electrodes includes flowing the solution in a flow path defined by a planar gasket disposed between the first and second polymer-carbon electrodes.

12. The method of claim 10, wherein flowing the solution between the first and second polymer-carbon electrodes includes flowing the solution in a serpentine shaped flow path between the first and second polymer-carbon electrodes.

13. The method of claim 10, wherein flowing the solution between the first and second polymer-carbon electrodes includes flowing the solution in a flow path sandwiched between the first and second polymer-carbon electrodes oriented parallel to each other.

14. A method comprising:

flowing a solution of 18F− ions in water between first and second polymer-carbon electrodes;

trapping 18F− ions on the first polymer-carbon electrode by applying a potential between the first and second polymer-carbon electrodes;

releasing at least some of the 18F− ions from the first polymer-carbon electrode by reversing the potential between the first and second polymer-carbon electrodes; and extracting the at least some of the 18F− ions released from the first polymer-carbon electrode by flowing a solvent between the first and second polymer-carbon electrodes while reversing the potential between the first and second polymer-carbon electrodes.

15. The method of claim 14, further comprising heating the first polymer-carbon electrode while applying the potential between the first and second polymer-carbon electrodes.

16. The method of claim 14, wherein the first and second polymer-carbon electrodes are formed from a blend of polymeric material and carbon particles.

17. The method of claim 16, wherein the carbon particles in the first and second polymer-carbon electrodes are formed from glassy carbon.

18. The method of claim 14, further comprising removing the water from between the first and second polymer-carbon electrodes after flowing the solvent between the first and second elongate electrodes.

19. A method comprising:

flowing a solution of 18F− ions in water along a serpentine shaped flow path disposed between first and second electrodes;

applying a potential between the first and second electrodes to collect 18F− ions on the first electrode;

changing the potential between the first and second electrodes to release at least some of the 18F− ions from the first electrode; and extracting the at least some of the 18F− ions released from the first electrode by flowing a solvent between the first and second electrodes while changing the potential between the first and second electrodes.

20. The method of claim 19, wherein the first and second electrodes are co-planar and flowing the solution includes flowing the solution in the serpentine shaped flow path that is disposed in a common plane as the first and second electrodes.

* * * * *